(12) United States Patent
Olive

(10) Patent No.: US 6,739,284 B1
(45) Date of Patent: May 25, 2004

(54) HUMMINGBIRD FEEDER HAVING REMOVABLE VESSEL UNIT

(76) Inventor: Daniel R. Olive, 5389 Pioneer Dr., Cincinnati, OH (US) 45247

(*) Notice: Subject to any disclaimer, the term of this patent is extended or adjusted under 35 U.S.C. 154(b) by 0 days.

(21) Appl. No.: 10/207,638

(22) Filed: Jul. 29, 2002

Related U.S. Application Data

(60) Provisional application No. 60/309,574, filed on Aug. 2, 2001.

(51) Int. Cl.$^7$ ................................................. A01K 7/00
(52) U.S. Cl. ....................... 119/74; 119/72; 119/52.1; 119/61
(58) Field of Search ........................... 119/74, 77, 51 R, 119/18, 52 R, 51.01, 51.5, 52.1, 52.2, 57.8, 61, 72, 76, 72.5; D30/2, 125, 121, 124, 129, 13; D7/304

(56) References Cited

U.S. PATENT DOCUMENTS

| | | | |
|---|---|---|---|
| 586,878 A | * | 7/1897 | Stewart |
| 2,791,984 A | * | 5/1957 | Franklin |
| 2,946,308 A | * | 7/1960 | Harris |
| 3,720,184 A | | 3/1973 | Pearce |
| 4,022,159 A | * | 5/1977 | Salvia ........................... 119/19 |
| 4,134,365 A | * | 1/1979 | Futers et al. ................ 119/51.5 |
| 4,558,662 A | | 12/1985 | Peterson |
| 4,632,061 A | * | 12/1986 | Tucker et al. ............. 119/51 R |
| 4,738,221 A | | 4/1988 | Nock |
| 4,787,337 A | * | 11/1988 | Mayer .......................... 119/18 |
| 4,938,168 A | * | 7/1990 | Meidell ........................ 119/77 |
| 5,062,390 A | | 11/1991 | Bescherer et al. |
| 5,140,945 A | | 8/1992 | Barnhart et al. |
| 5,301,634 A | * | 4/1994 | Ho ............................... 119/18 |
| 5,655,477 A | | 8/1997 | Hoffman et al. |
| 5,682,835 A | | 11/1997 | Walter et al. |
| 5,740,759 A | | 4/1998 | Cummings |
| 5,775,257 A | * | 7/1998 | Park ........................... 119/57.8 |
| D406,924 S | * | 3/1999 | Kolozvari .................. D30/121 |
| 5,924,382 A | | 7/1999 | Shumaker |

FOREIGN PATENT DOCUMENTS

FR  08612292  *  3/1988 ............ A01K/5/01

* cited by examiner

*Primary Examiner*—Peter M. Poon
*Assistant Examiner*—Andrea M. Valenti
(74) *Attorney, Agent, or Firm*—Wood, Herron & Evans, L.L.P.

(57) ABSTRACT

A hummingbird feeder comprising a two-part housing and a vessel unit supported by the housing. The vessel unit may be prefilled with a sugar and water solution. Once the sugar and water solution has been emptied from the vessel unit, the two housing pieces may be separated, the empty vessel unit removed, and a full new vessel unit placed inside the housing. Alternatively, the vessel unit may be refilled.

10 Claims, 5 Drawing Sheets

HUMMINGBIRD FEEDER HAVING REMOVABLE VESSEL UNIT

CROSS-REFERENCE TO RELATED APPLICATIONS

This application claims the benefit of U.S. provisional patent application Serial No. 60/309,574 filed Aug. 2, 2001 entitled "Hummingbird Feeder With Disposable Drum" which is fully incorporated by reference herein.

FIELD OF THE INVENTION

This application relates generally to bird feeders and, more particularly, to a hummingbird feeder which supplies an aqueous nutrient solution to hummingbirds.

BACKGROUND OF THE INVENTION

In part due to their unique characteristics such as rapid wing beat, people like to watch hummingbirds. Consequently, people who live in areas inhabited by hummingbirds encourage their presence via the use of hummingbird feeders. Hummingbird feeders differ from conventional bird feeders in that they provide a solution of granulated sugar and water as opposed to dry feed.

There are basically three types or configurations of hummingbird feeders. The first type utilizes a tube extending from the bottom of a bottle such as is shown in U.S. Pat. No. 4,558,662. This type of hummingbird feeder exposes the solution which the hummingbirds eat at the bottom of the tube at all times, thus attracting bees, ants, and other unwanted insects to the feeder. In addition, this type of feeder requires frequent cleaning and refilling to be effective. This type of feeder is also susceptible to "drool effect", wherein the fluid in the tube is forced out of the tube by thermal expansion of the air inside the bottle. If left outside for too long between cleanings, the aqueous solution will ferment or become sour, causing the hummingbirds to ignore the feeder in favor of more suitable food sources. Direct exposure to sunlight exacerbates the fermentation process.

A second type of hummingbird feeder comprises a bottle or jar, the neck of which is located inside a pan. This type of hummingbird feeder is disclosed in U.S. Pat. Nos. 5,682,835 and 3,720,184. This type of feeder utilizes an internal vacuum to meter the flow of the solution of the bottle according to demand from the hummingbirds. Although this type of hummingbird feeder does not have solution immediately accessible to insects, it can be subject to the "drool effect" and it does require the same frequent cleaning as described above with regard to the first type of feeders. In order to reduce the frequency of the requisite cleaning, these types of feeders are commonly very large in capacity, onerous to handle during cleaning and wasteful because the birds may not be able to consume all of the solution prior to fermentation. Partial filling of large bottles invites the "drool effect." Direct exposure to sunlight also causes the fermentation process to occur in these types of feeders.

The third type of feeder is a pan with a cover, which, like the other two types of feeders, requires frequent cleaning. In addition, this type of feeder often allows access to the aqueous solution by bees when full because the fluid level is variable.

Regardless of which type of hummingbird feeder is used, the entire feeder must be cleaned regularly, thus requiring regular, careful maintenance to keep attracting hummingbirds and avoid harming the birds due to the existence of cleaning agents resulting from cleaning the feeders. In addition, hummingbirds feeding from an existing aqueous solution contaminate the feeder with residue, i.e. pollen, mold, etc. that the individual hummingbird has transported from other hummingbird feeders and/or flowers. Thus, the source of aqueous solution is consistently being contaminated as it is being consumed.

Another difficulty with each of the types of feeders described hereinabove is that the owner of the hummingbird feeder must prepare a suitable aqueous solution using the right ingredients, mixed in the proper proportions, in a safe manner, and avoid exposing the birds to potentially harmful chemical contaminants left over from cleaning. In doing so, boiled water is frequently used, as opposed to tap water, to ensure the safety of the solution. Thus, filling the hummingbird feeder with an aqueous solution (food for hummingbirds) is a time-consuming, arduous proposition. Therefore, it has been one objective of the present invention to provide a hummingbird feeder which provides an aqueous nutrient solution in a safe, clean manner.

Further, it is another objective of the present invention to provide a hummingbird feeder which need not be frequently cleaned and thus exposed to harmful cleaning chemicals.

It is a further objective of the present Invention to provide a hummingbird feeder which is self-shading and self-cooling, thus slowing the fermentation process of the aqueous solution inside the feeder.

It is another objective of the present invention to provide a hummingbird feeder in which the fluid level of the feeder may be visually monitored at any time.

SUMMARY OF THE INVENTION

The invention of this application which accomplishes these objectives comprises a hummingbird feeder which may be quickly and easily placed on any structure such as the side of a building, a fence post, a window or a tree. The hummingbird feeder comprises of a two-part housing, including a front housing piece and a rear housing piece, the housing pieces being adapted to be removably coupled together. The housing is preferably made of plastic but may be made of any other material. One type of plastic which has proven to be effective is polycarbonate.

A vessel unit is removably located inside the housing. In one preferred embodiment of the present invention, a vessel portion of the vessel unit is prefilled with a sugar and water solution which is food for the hummingbirds. Once the sugar and water solution has been used, the vessel unit may be disposed or recycled. The disposable vessel unit comprises a generally cylindrical vessel portion and a pan portion in fluid communication with the vessel portion. Although one configuration of vessel unit is illustrated and described, the vessel unit may assume other configurations in accordance with the present invention. The pan portion is able to hold less volume than the vessel portion and is located in front thereof. The pan portion of the vessel unit has a feeder hole therethrough which may be removably covered by a cap or seal. When one wishes to utilize the disposable vessel unit, one peels off the cap or seal, thus exposing the feeder hole.

The pan portion of the vessel unit projects through an opening formed in the front housing piece so as to expose the feeder hole to hummingbirds interested in feeding at the feeder.

An adjustable arcuate perch is secured to the front housing piece and is used by the hummingbirds when feeding. Other configurations of perches may be incorporated into the present invention if desired. In addition, the user may bend or otherwise modify the perch to accommodate different species of hummingbirds.

The disposable vessel unit is preferably made of a clear material so that one may monitor the fluid level inside the vessel unit. One material which has proven satisfactory in this regard is high-density polyethylene. However, any other clear material will function satisfactorily and may be used.

In operation, one takes a disposable vessel unit and removes the cap from the pan portion of the unit so as to expose the feeder hole. Then one hangs the disposable vessel unit from the rear housing piece support in order to locate the disposable vessel unit in place. One then couples the front housing piece to the rear housing piece to complete the housing with the disposable vessel unit therein. In this manner, the hummingbird feeder of the present invention may be quickly and easily assembled. When the sugar and water solution inside the disposable vessel unit has been exhausted, the vessel unit is removed and a full vessel unit is hung from the support of the rear housing piece before the front housing piece is coupled to the rear housing piece. The emptied vessel unit may be disposed or preferably, recycled.

In an alternative embodiment of the present invention, the vessel unit is not prefilled but rather empty when purchased by the user. The vessel portion of the vessel unit has a neck with a threaded exterior surface to receive a removable cap. The user may fill the vessel unit with sugar and water solution as he or she desires.

In yet another alternative embodiment of the present invention, the vessel unit has a valve incorporated therein. Use of the valve permits the user to keep the fluid in the vessel portion of the vessel unit until he or she is ready to use the vessel unit. These and other objects and advantages of the present invention will be more readily apparent from the following description of the drawings.

BRIEF DESCRIPTION OF THE DRAWINGS

FIG. 2A is a perspective view of the present invention illustrating the vessel unit secured to the rear housing piece.

DETAILED DESCRIPTION OF THE DRAWINGS

Figure 1:
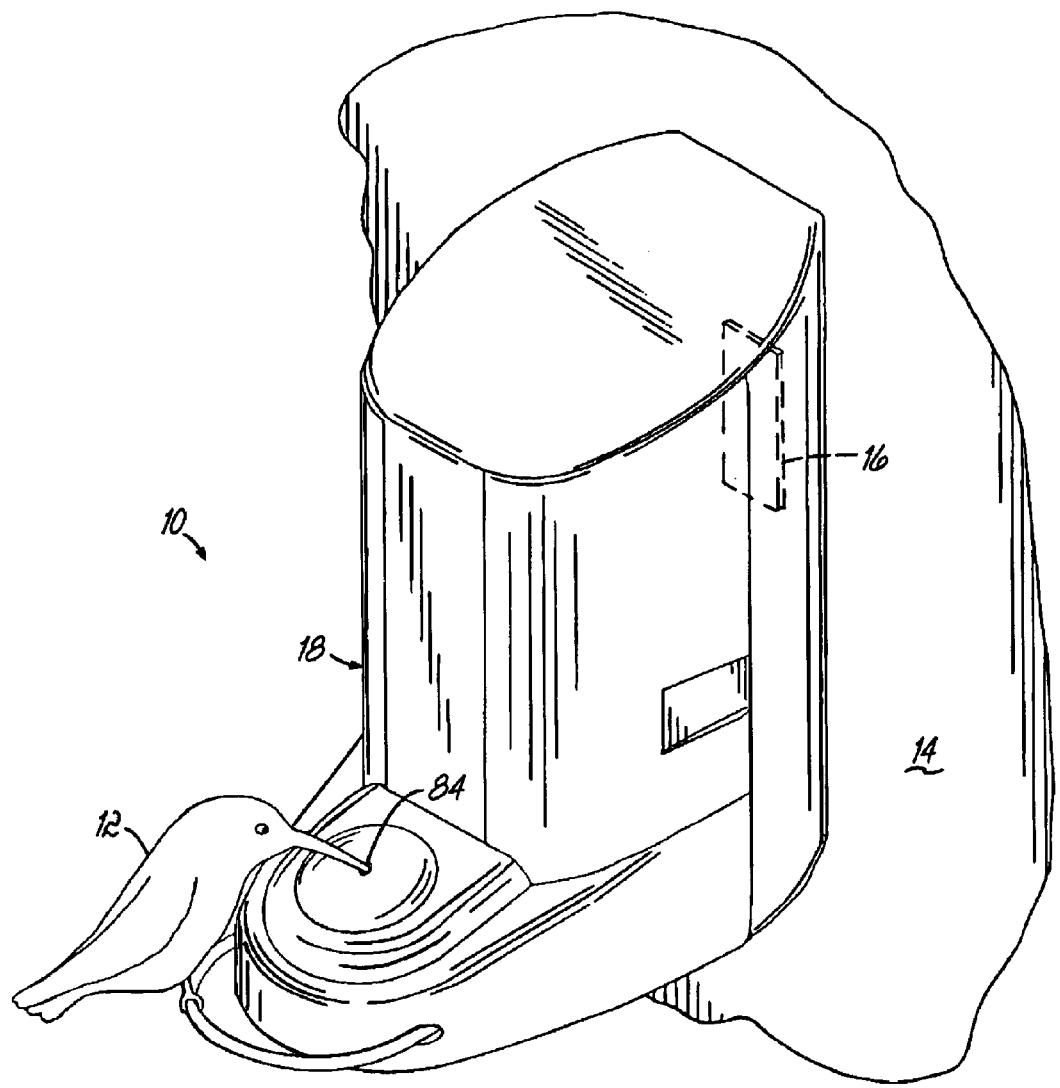
FIG. 1 is a perspective view of a hummingbird feeding from the hummingbird feeder of the present invention.

Referring to the drawings, and to particularly to FIG. 1, there is illustrated a hummingbird feeder 10 used to attract and feed hummingbirds 12 (only one being shown). The hummingbird feeder 10 is secured to a structure 14 which may be a fence post, side of a building, or any other structure with the use of a double-sided adhesive strip 16. One such strip which has proven satisfactory is called a Command Strip™ manufactured by the 3M company. Other methods of attaching the hummingbird feeder 10 to a supporting structure such as hanging the feeder from a nail, may be utilized in accordance with the present invention as well. This application does not intend to limit the method of attachment of the hummingbird feeder to a fence post, building, or other structure.

Figure 2:
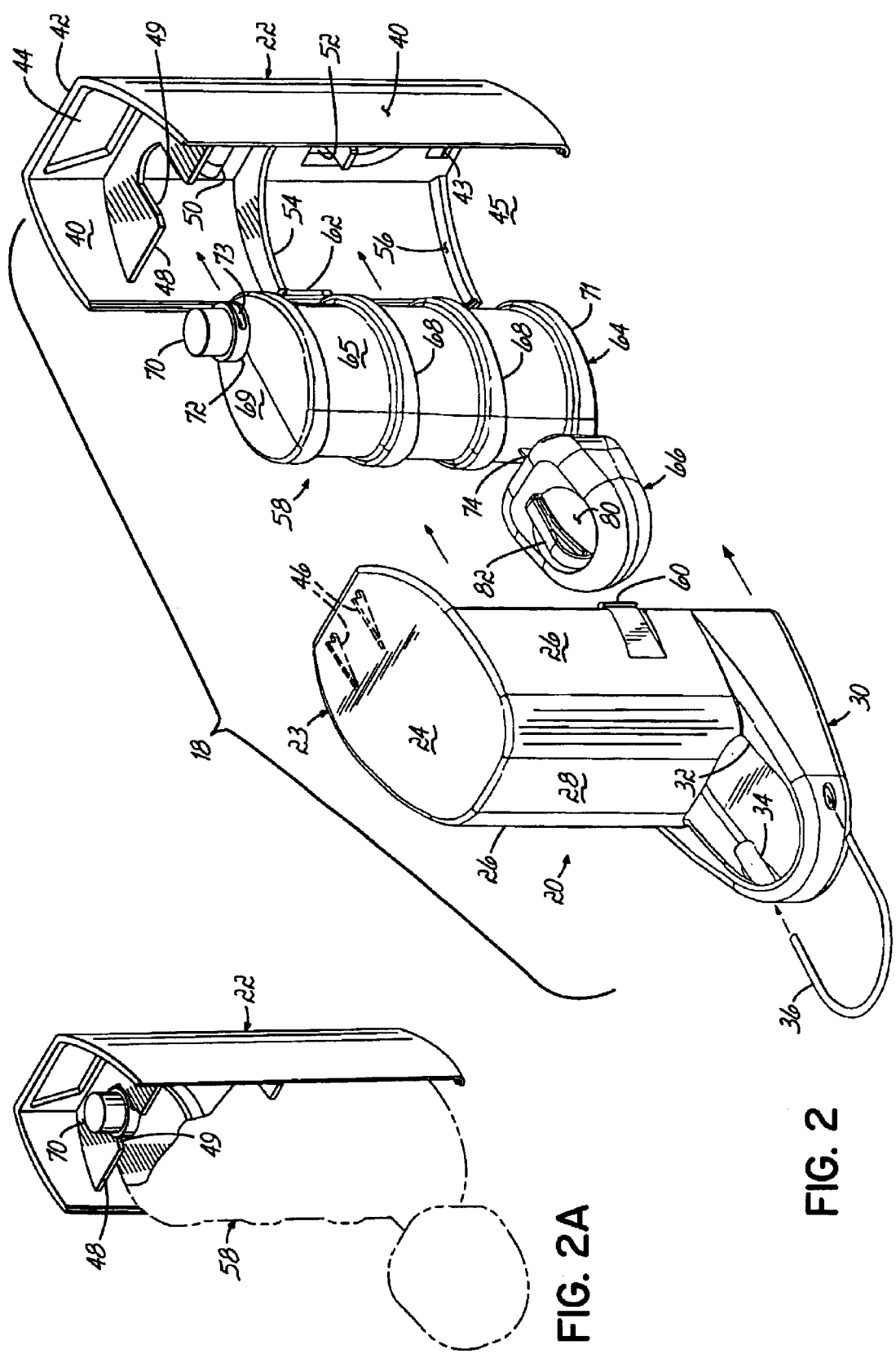
FIG. 2 is a disassembled perspective view of the present invention illustrating all the components of the invention.

The different components of the hummingbird feeder of the present invention are best illustrated in FIG. 2. A housing 18 comprises two pieces: a front housing piece 20 and a rear housing piece 22 adapted to be coupled together. The front housing piece 20 has a an upper section 23 including top or roof 24, a pair of side portions 26 and a front portion 28. The front housing piece 20 further comprises a lower section 30 having an opening 32 which will be described in more detail below. The lower section 30 of the front housing piece 20 also has a pair of receptacles 34 (only one being shown) adapted to receive and retain an adjustable perch 36. Although the perch 36 is illustrated as being generally C-shaped, it may assume other configurations as well in accordance with the present invention.

The rear housing piece 22 has a pair of side portions 40, a rear portion 42 and an open bottom 45. The open bottom 45 promotes cooling of the vessel unit 58 via air flow when the housing pieces 20, 22 are coupled together. An airflow opening 44 is formed in the top of the rear portion 42 of the rear housing piece 22 which is adapted to receive projections 46 integrally formed in the front housing piece 20. A support 48 having an indentation 49 is integrally formed in the rear housing piece 22 and projects inwardly from the rear portion 42 of the rear housing piece 22. Although one configuration of support 48 is illustrated, the support may assume other configurations in accordance with the present invention.

A level 50 may be adhered to the rear portion 42 of the rear housing piece 22 in order to ensure that the rear housing piece 22 is level when secured to a supporting structure 14. An opening 52 is located below the level 50 to aid the user in removing the Command Stripe™ 16 from its location between the rear housing piece 22 and the wall or supporting structure 14. By pulling down on the Command Strip™ 16, the Command Strip™ 16 may be removed and the feeder subsequently removed from the supporting structure 14. In addition, each side portion 40 and the rear portion 42 of the rear housing piece 22 has an upper flange 54 to help locate the vessel unit 58 in place. The side portions 40 also have a lower flange 56 projecting inwardly therefrom. The rear portion 42 of the housing also has a bumper 43 at the lower end thereof to help secure the vessel unit 58 in its correct location.

In order to secure the front housing piece 20 to the rear housing piece 22, tabs 60 (only one being shown) formed in the side portions 26 of the front housing piece 20 are engaged with recesses 62 (only one being shown) formed in the side portions 40 of the rear housing piece 22. By pushing inwardly on the tabs 60, the housing 18 may be opened and the vessel unit 58 removed from inside the housing 18. When the housing pieces 20, 22 are coupled together the housing protects the vessel unit 58 from the direct sun, thereby shading the vessel unit and slowing the fermentation process of the fluid inside the vessel unit 58.

Each of the housing pieces 20, 22 is preferably injection molded of a see-through plastic material such as polycarbonate. However, these housing pieces may be made of any other material in accordance with the present invention.

Figure 3:
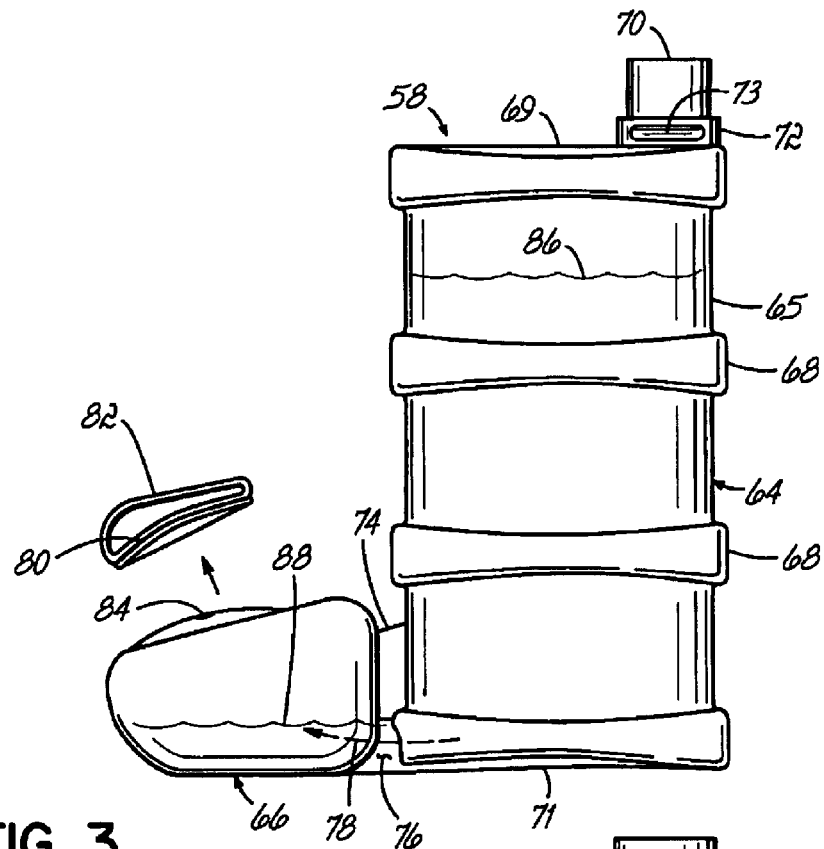
FIG. 3 is a partially disassembled side elevational view of a disposable vessel unit.

As illustrated in FIGS. 2 and 3, the vessel unit 58 has three principle components, a vessel portion 64, a connection portion 74 and a pan portion 66. The vessel portion 64 has a body 65 including multiple ribs 68, a top 69, a bottom 71 and is shaped like a drum. However other configurations may be used in accordance with the present invention. The body 65 of the vessel portion 64 is adapted to contact the flange 54 of the rear housing piece 22 when the vessel unit 58 is supported between the housing pieces.

In the embodiment of the present invention illustrated in FIGS. 2, 2A and 3, the vessel unit 58 is prefilled and may only be used once. The vessel unit 58 has a sealed cylinder 70 formed at the top thereof, on top of a flange 72. The flange 72 has a pair of opposing grooves 73 adapted to receive the support 48 in a manner shown in FIG. 2A. As illustrated in FIG. 2A, the cylinder 70 is supported by the support 48 of the rear housing piece 22 such that the vessel unit 58 hangs from the support 48.

As best illustrated in FIG. 3, the pan portion 66 of the prefilled, disposable vessel unit 58 is integrally joined to the vessel portion 64 with a connecting portion 74. As part of the connecting portion 74, a fluid passageway or tube 76 allows the sugar and water solution to pass in the direction of arrow 78 from the vessel portion 64 to the pan portion 66 of the vessel unit 58, and establishes the fluid level in the pan portion 66 where it is consumed by the hummingbirds. See FIG. 3. A removable cap 80 having a handle 82 (see FIG. 2) is removably secured to the top of the pan portion 66. The removable cap 80 covers a feeder hole 84 through which the hummingbird inserts its beak to feed from the sugar and water solution located in the pan portion 66 as illustrated in FIG. 1.

Referring to FIG. 3, the material from which the disposable vessel unit 58 is made is preferably see-through so that one may monitor the level 86 of sugar and water solution in the vessel portion 64 and the level 88 of sugar and water solution in the pan portion 66 of the disposable vessel unit 58. One material which has proven satisfactory for this purpose is polyethylene; however, other materials may be used as well.

Figure 3A:
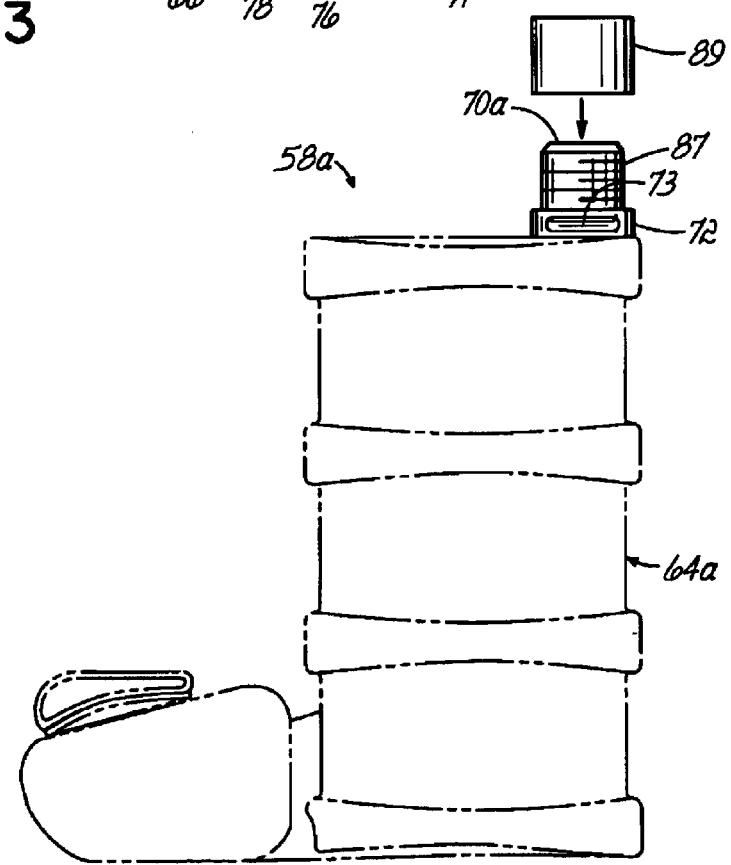
FIG. 3A is a partially disassembled side elevational view of the vessel unit in an alternative embodiment of the present invention.

FIG. 3A illustrates an alternative embodiment of the present invention in which the vessel unit is not prefilled but rather filled as desired by the user. The user may reuse the vessel unit as often as desired. Consequently, the cylinder 70a of the vessel unit 64a has external threads 87 adapted to engage internal threads (not shown) integrally formed inside a removable cap 89.

Figure 4:
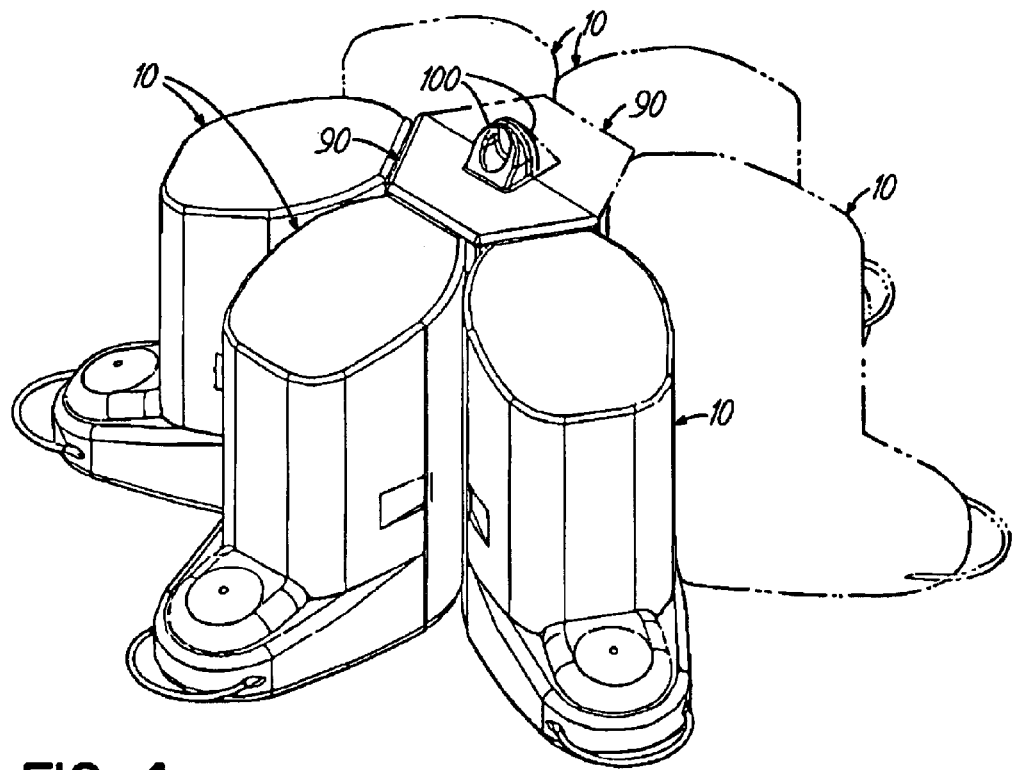
FIG. 4 is a perspective view of multiple hummingbird feeders of the present invention being secured to an adapter.
Figure 5:
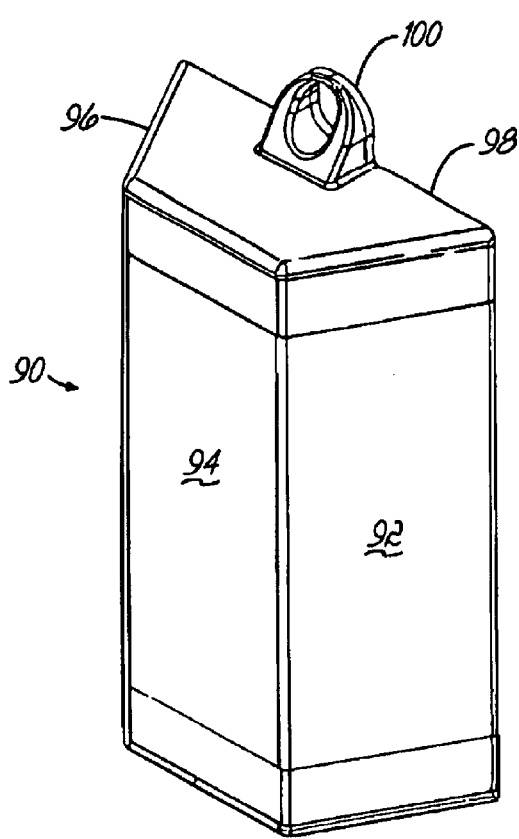
FIG. 5 is a perspective view of the front of the adapter of the present invention.

Turning to FIGS. 4 and 5, an adaptor 90 having three sides 92, 94, and 96 may be used to secure up to three hummingbird feeders of the present invention to one structure (see FIG. 4). The adaptor 90 preferably has a hanger 100 located at the top thereof in order to hang the adaptor 90 from a wall, tree or other suitable structure. Using the Command Strips™ 16, a hummingbird feeder 10 may be secured to each of the sides 92, 94 and 96 of the adaptor 90.

As illustrated in FIG. 4, two adaptors 90 may be placed back-to-back so that up to six hummingbird feeders in accordance with the present invention may be incorporated into a unitary structure. The three additional hummingbird feeders are illustrated in phantom lines in FIG. 4. In order to join two adaptors 90 together, each adaptor 90 has a pair of couplers 91, best illustrated in FIG. 6. The couplers 91 of one adaptor 90 engage the couplers 91 of the other adaptor to create the structure illustrated in FIG. 4.

Figure 6:
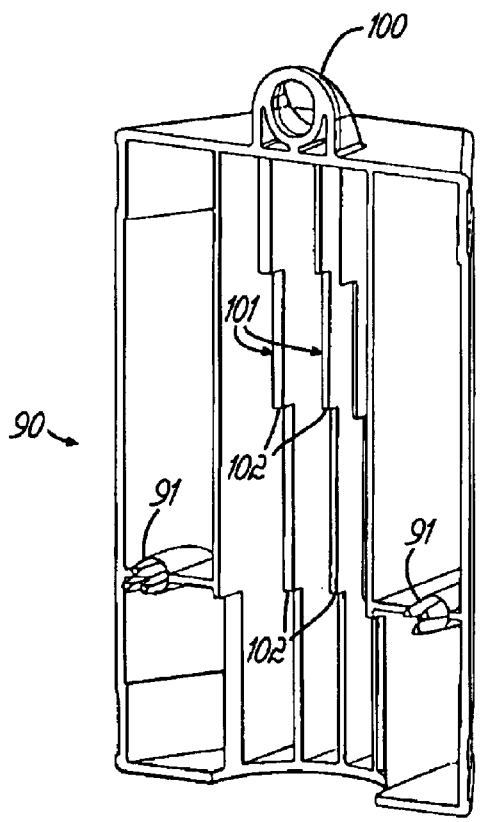
FIG. 6 is a perspective view of the rear of the adapter of the present invention.
Figure 7:
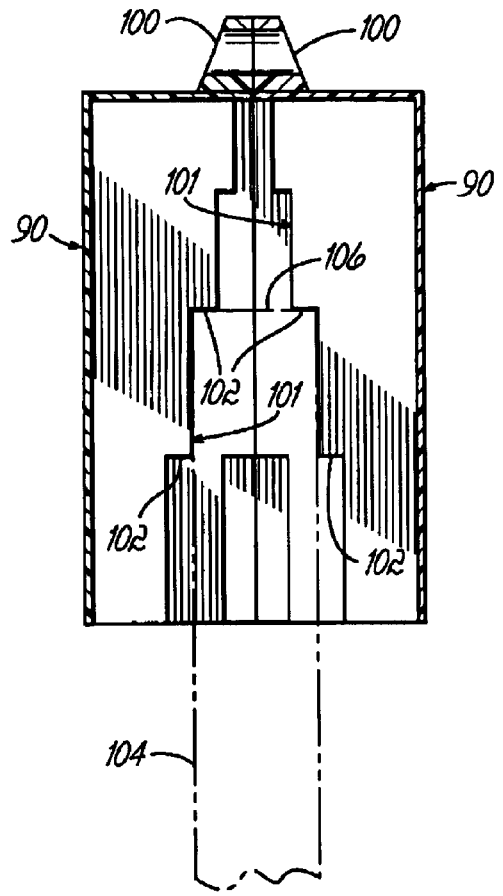
FIG. 7 is cross sectional view of a pair of adapters coupled together for resting on a post.

As illustrated in FIGS. 6 and 7, the inside of the adaptor 90 has a series of spaced, vertically oriented ribs 101, each rib 101 having several steps or horizontal supporting surfaces 102. As illustrated in FIG. 7, when two adaptors 90 are joined together, the steps 102 line up to provide a stop adapted to abut the upper surface 106 of a post or pole 104. Due to this unique configuration of the adaptors 90 of the present invention, the adaptors may rest on top of poles or posts of different diameters.

Figure 8:
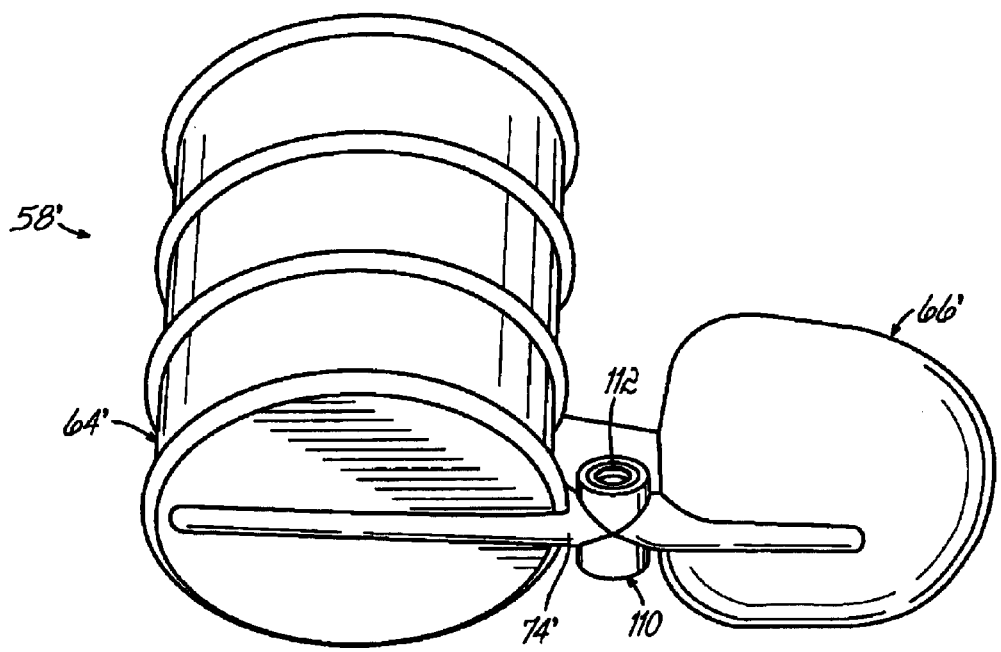
FIG. 8 is a perspective view of the vessel unit in an alternative embodiment of the present invention.

FIG. 8 illustrates an alternative embodiment of the present invention. In this embodiment the vessel unit 58' has a valve housing 110 integrally formed in the connecting portion 74' which holds and receives a valve 112. Any type of valve may be used in accordance with the present invention. The valve 112 enables the user to control the flow from the vessel portion 64' to the pan portion 66' of the vessel unit 58'.

While I have described several embodiments of the present invention, those persons skilled in the art will appreciate changes and modifications which may be made while still practicing the invention of this application. Therefore, I do not intend to be limited except by the scope of the following claims.

What is claimed is:

1. A hummingbird feeder comprising:
   a housing including a front housing piece and a rear housing piece adapted to be removably coupled together, said front housing piece having an upper section and a lower section,
   a vessel unit removably located inside said housing, said vessel unit comprising a vessel portion and a pan portion in fluid communication with said vessel portion, wherein said pan portion extends through an upwardly directed opening in said lower section of said front housing piece and is accessible to hummingbirds, wherein said vessel unit is supported from said rear housing piece of said housing.

2. The hummingbird feeder of claim 1 wherein said vessel unit is pre-filled with fluid.

3. The hummingbird feeder of claim 1 wherein said housing is made of plastic.

4. The hummingbird feeder of claim 1 further comprising an arcuate perch secured to said housing.

5. The hummingbird feeder of claim 4 wherein said arcuate perch is adjustable.

6. The hummingbird feeder of claim 1 wherein said housing and vessel unit are see-through.

7. A hummingbird feeder comprising:
   a housing including a front housing piece and a rear housing piece, said front housing piece of said housing having a lower section and an upper section, said lower section extending forwardly from said upper section, said housing pieces being adapted to be removably coupled together,
   a vessel unit containing fluid, said vessel unit being removably located inside said housing, said vessel unit comprising a vessel portion and a pan portion in fluid communication with said vessel portion, said pan portion having a feeder hole and extending into said lower section of said front housing piece and through an opening in said lower section of said front housing piece, wherein said housing has an opening adapted to receive said pan portion of said vessel unit.

8. The hummingbird feeder of claim 7 further comprising a removable cap adapted to cover the feeder hole in said pan portion of said vessel unit.

9. The hummingbird feeder of claim 7 further comprising an arcuate perch secured to said housing.

10. The hummingbird feeder of claim 7 wherein said housing and vessel unit are see-through.

* * * * *